Patented Jan. 8, 1946

2,392,389

UNITED STATES PATENT OFFICE 2,392,389

PROCESS FOR OBTAINING DECOLORIZED POLYTETRAFLUOROETHYLENE

Robert M. Joyce, Jr., Marshallton, Del., assignor to E. I. du Pont de Nemours & Company, Wilmington, Del., a corporation of Delaware No Drawing. Application October 25, 1943, Serial No. 507,610

4 Claims. (Cl. 260—80)

This invention relates to polymeric materials and more particularly to an improved polytetrafluoroethylene.

Polytetrafluoroethylene was first prepared as described in U. S. Patent 2,230,654 by subjecting tetrafluoroethylene to pressure for several days. More practical and rapid methods later developed include heating under pressure with an aqueous solution of an inorganic peroxide, or heating under pressure in the presence of an organic peroxide, water or oxygen. The polymerized tetrafluoroethylene is high softening, but the product obtained, as stated in the above mentioned patent, can be molded under sufficiently high pressure and temperature. However, polytetrafluoroethylene produced under many conditions, including those conditions most readily adaptable to commercial operation, undergoes discoloration when subjected to molding processes. This discoloration is particularly disadvantageous when the polymer is employed for purposes requiring transparency, as in corrosion resistant windows for apparatus.

This invention has as an object the production of an improved polytetrafluoroethylene which does not discolor when heated under molding conditions. A further object is a method for obtaining molded polytetrafluoroethylene articles which are free from discoloration. Other objects will appear hereinafter.

The above objects are accomplished by a method which comprises heating a heat-darkenable polytetrafluoroethylene at a temperature in the range of 50°–500° C. in an oxidizing atmosphere containing a gaseous oxidizing agent capable of liberating iodine from an acidified aqueous solution of potassium iodide.

In the best method of practicing the invention, the polymer, in a form exposing a large surface area, as a powder, porous lumps or flakes, is heated in the presence of air or oxygen at a temperature of 350° to 425° C. for a period of at least one-half hour until the desired results are obtained. The length of time required depends on the physical form of the polymer, the degree of exposure of the polymer mass, and the activity of the oxidizing agent employed. The polymer thus treated is then molded in a mold at 350° to 425° C. under pressures of from about 100 lbs./sq. in. to at least 3000 lbs./sq. in, followed by controlled cooling. The molded objects thus prepared are free from discoloration and are clear and transparent in thin sections.

It is to be observed that the results accomplished by this invention cannot be obtained simply by the heating involved in the molding step because for the present purpose the heating must be in the presence of an oxidizing atmosphere, e. g. air, whereas the heating in molding, by reason of the thermoplastic nature of the polymer, is in a closed system under pressure, where the polymer does not have access to air.

An advantageous method of heating the polymer to expose as much of the polymer surface as possible consists in passing a layer of the polymer on a conveyor through a zone heated to the necessary temperature at such a rate that the polymer is in the heated zone from about thirty to forty-five minutes.

The polymer during the heating operation first becomes dark, the dark color then disappears and the polymer becomes colorless, and then becomes white when it is cooled. Molded sheets prepared from polymer which has been subjected to this treatment are colorless and in addition have a more homogeneous appearance than those prepared from untreated polymer. The flow properties of the polymer under molding conditions are considerably improved.

The following examples are illustrative of methods for practicing the invention.

Example I

Powdered polytetrafluoroethylene is spread in a thin layer on a steel plate covered with aluminum foil and is baked exposed to air in an electric furnace at 425° C. for one hour. Films are pressed from this polymer by placing it between aluminum foil-covered steel plates and heating at 400° C. and 500 lbs./sq. in. for 5 minutes, followed by quenching in water. In contrast to the mottled brown films prepared from this polymer without the previous heat treatment, the films obtained from the heat treated polymer in accordance with the present example are colorless, transparent, and extremely tough. The polymer after the heating in air flows more smoothly and evenly during the molding operations, and the resulting films have a smoother appearance than those prepared from the untreated polymer.

In the practice of this invention, the steps of heating the polymer in the presence of oxygen and of forming it into the article are not limited to the sequence of first applying the heat treatment and then forming the article since for molding and other purposes, such as the production of improved electrically insulated products, the article can first be formed from the polymer and the heat treatment applied thereto.

In the following example molded articles characterized by entire absence of color and having other improved physical properties are obtained by applying the heat treatment in air to the article after it has been molded. Because of the small polymer surface exposed, longer heating periods are required with this type of decolorization. However, after a suitable heating period, the entire mass of the molded article is decolorized.

*Example II*

Cylindrical chips of polytetrafluoroethylene 2" in diameter and ¼" thick are pressed from powdered polymer at room temperature and 4770 lbs./sq. in. These cold pressed chips can be converted to tough resilent moldings by a sintering process of relatively short duration. For example, this sintering can be accomplished by heating the chips in a furnace or in a hot liquid (e. g. a fused mixture of sodium and potassium nitrates) for sufficient time to heat the entire polymer mass to sintering temperature—about 350°–400° C. However, the moldings so produced are discolored, generally tan to dark brown. That is, the sintering process, if conducted in a furnace, is of too short duration to effect the decolorization which is the subject of the present invention. Sintering in a salt bath precludes any contact of the polymer with air or other gaseous oxidizing agent.

However, according to the present invention, the cold pressed chips are heated, exposed to air in an electric furnace at a temperature of 385° to 425° C. for 2 hours. When removed from the furnace the chips are glass clear. After cooling to room temperature they become white and opaque, but contain none of the brown discoloration observed in articles molded from the same polymer but not subjected to the same heat treatment in the presence of air, or subjected only to the normal short sintering in air.

Polytetrafluoroethylene moldings can also be prepared by subjecting powdered polymer to a temperature of 350°–400° C. and a pressure of about 300–3000 lbs./sq. in. in a mold, followed by cooling at a slow uniform rate. The brown or gray discoloration of such moldings is eliminated by heating to 400° C. in air for 2 hours, followed again by slow controlled cooling.

*Example III*

Powdered polytetrafluoroethylene is compressed at room temperature to form chips 2" in diameter by 0.25" thick. These are converted to tough resilient moldings by sintering in a furnace at 380° C. for 0.5 hour. The moldings so produced are tan colored. These moldings are placed in a bomb and treated with chlorine gas under 100 lbs./sq. in at 120° C. for 8 hours. The resulting moldings are almost white, having a slight yellow tinge caused by absorbed chlorine. This chlorine is eliminated and the moldings are consequently further whitened by heating them in air at 180° C. for 3 hours.

The oxidizing atmosphere in which the polymer is heated is most conveniently substances which liberate iodine from an acidified aqueous solution of potassium iodide. These include oxygen, chlorine, bromine, higher oxides of nitrogen (e. g. $N_2O_3$, $NO_2$), nitric acid, ozonized air, etc.

The temperature at which the decolorization is carried out depends on the oxidizing agent employed. Strong oxidizing agents, such as chlorine and $NO_2$, can be employed at relatively low temperatures. In fact, decolorization with such agents can be effected at room temperature, although at an impractically low rate. It is preferable to operate with such agents in the temperature range 100°–400° C., and their use at a temperature of 500° C. is within the scope of the invention. The decolorization is more rapid at higher temperatures. Less active oxidizing agents, such as oxygen (i. e., also air) are preferably employed above 300° C. and preferably in the range 300°–500° C.

It does not suffice merely to achieve the above mentioned reaction conditions—these must be maintained for an appreciable time in order to effect the decolorization. The decolorization is most rapid with finely divided polymer presenting a maximum surface area. With the polymer in this form a reaction period of 0.5–2 hours is satisfactory for either powerful oxidizing agent (e. g., $Cl_2$, $NO_2$) at 100°–200° C., or for moderate oxidizing agents (e. g., air) at 300°–400° C. However, massive objects, which have a relatively low surface/volume ratio, may require several hours for complete decolorization. It is sometimes satisfactory in such cases to diminish the reaction period by decolorizing only the outsides of a massive piece; in any case, however, a period of at least 0.5 hour is required for satisfactory results.

Superatmospheric pressure is not an essential feature of this declororization treatment. However, particularly when treating massive molded objects it is desirable to accelerate the decolorization by operating under pressures above atmospheric.

This invention enhances the value and utility of polytetrafluoroethylene for molding and other applications. For example, a large improvement in the tensile strengths of films pressed from this polymer is brought about by the present process. Thus, a film pressed from the polymer that did not receive the heat treatment had a tensile strength of 1360 lbs./sq. in. and an elongation of 163%, whereas a film pressed from the same polymer after the powdered polymer had been heated in air at 400° C. for 1 hour had a tensile strength of 2840 lbs./sq. in. and an elongation of 398%.

A particularly valuable application of this invention resides in the production of improved electrically insulated products. This improvement is shown by measurements of dielectric strength on films prepared from the treated and untreated portions of the same batch of polymer. Films prepared from untreated polymer, ranging in thickness from 11 to 15 mils, have dielectric strengths ranging from 550 to 1000 volts per mil. On the other hand, films prepared from the heat treated polymer 20 to 25 mils thick have dielectric strengths ranging from 900 to more than 1100 volts per mil. Since dielectric strength is known to decrease with increasing thickness, the marked improvement brought about by the process of this invention will be readily apparent. The heat treated polymer is especially useful in electrical applications where superior dielectric properties and an extremely low power factor is desired.

Because of its inertness and low refractive index (1.35 with sodium D line), thin films of the polymer are valuable for optical purposes; polymer decolorized according to the present invention is particularly adapted for such purposes.

Electrically insulated wire can be prepared by heating the polytetrafluoroethylene in a form presenting a large surface area, as films or particles, in an oxidizing atmosphere as previously described and then molding the polymer around the wire at elevated temperature and pressure. Thus, the wire is pressed between films consisting of strips of the heat treated polymer at a temperature of 400° C. and a pressure of about 200 to 500 lbs./sq. in., followed by quenching in water. The coating of the wire can then be trimmed in such a way that a coating of polymer of any desired dimensions is left surrounding the wire. A coating of uniform thickness can be achieved by passing such a sample through a circular die in such a way that a round coating in which the wire is centered is obtained, or the polymer after heating in the oxidizing atmosphere can be extruded around a centrally located wire in such a way that a continuous coating on the wire is obtained. Electrical conductors can also be insulated by wrapping with fibers and films of polytetrafluoroethylene which have been previously heated in the oxidizing atmosphere. Insulation applied in this manner can be heat sealed with or without the presence of restraining means.

Conductors in the form of wire insulated with the present heat treated polytetrafluoroethylene can be used to wind the armatures of motors, especially motors which operate under heavy loads and high temperatures where oxidation conditions are important. Such insulated wire is particularly useful in winding the armatures of refrigeration motors, where the chemical stability of the insulated wire is necessary since the windings are contacted with chemically active refrigerants, such as sulfur dioxide and ammonia. Because of the fact that large uniform sheets of polytetrafluoroethylene are available, these can advantageously replace built-up mica as insulators for armature slots, commutator segments, and commutator V-rings. These applications are of special advantage when it is desired subsequently to anneal the motor armature in order to obtain increased conductivity; because of the lack of heat stability of organic binders required in the manufacture of built-up mica, a motor containing this type of insulation cannot be heated to the annealing temperature of copper wire. The improved polytetrafluoroethylene coated wires of this invention can also be employed advantageously in the winding of transformer coils, and of induction coils. Such wires can also be used to advantage as ignition cables for internal combustion engines, particularly for airplanes and tanks, where extreme stability to oxidation, high temperature, and gasoline and lubricating oil is very important. Such insulated wires are also extremely useful for electrical work in chemical plants because of their stability to all kinds of chemical attack.

Submarine and subterranean cables insulated with the heat treated polytetrafluoroethylene are advantageous in that they have excellent electrical properties, and in that the polymer has essentially no tendency to cold flow under the conditions of use. This provides a constant spacing between the conducting elements of the cable over a long period of time. Another advantage is that the cables are not subject to corrosion by salt water or by subterranean conditions.

Spark plugs, especially for aircraft motors, insulated with the present improved polytetrafluoroethylene instead of with mica can be employed advantageously because of their existance to vibration and to sudden shock, because of their excellent electrical properties even at high temperatures, and because the sheets necessary for this type of insulation are readily obtainable by molding polytetrafluoroethylene, which is not the case with mica.

The improved polytetrafluoroethylene described herein finds many electrical applications in radio apparatus, such as spacers and sockets for radio tubes, and particularly as a dielectric for radio and for telephone condensers. Its application as a condenser dielectric is particularly advantageous because of the extremely low power loss of such condensers over a wide range of temperatures and of frequencies, at either high or low humidities. Other uses in which the insulating properties of polytetrafluoroethylene are advantageous include forms for coils and resistors, spreaders and insulators for lead-in wires, and as coupling for high voltage transmitting shafts. Sheets of polytetrafluoroethylene are also useful as separators for storage battery plates.

As many apparently widely different embodiments of this invention may be made without departing from the spirit and scope thereof, it is to be understood that I do not limit myself to the specific embodiments thereof except as defined in the appended claims.

I claim:

1. A process for obtaining improved articles of manufacture comprising polytetrafluoroethylene which comprises the steps of heating heat darkenable polytetrafluoroethylene in a form presenting a relatively large surface area at a temperature of 50° to 500° C. in an oxidizing atmosphere for a period of at least one-half hour until decolorization of the polytetrafluoroethylene is essentially complete, and then forming the treated polymer into an article of manufacture.

2. In a process for obtaining improved molded articles from polytetrafluoroethylene the steps which comprise heating heat darkenable polytetrafluoroethylene in the form of particles presenting a relatively large surface area at a temperature of 50° to 500° C. in an oxidizing atmosphere for a period of at least one-half hour until decolorization of the polytetrafluoroethylene is essentially complete, and then molding the treated polymer under heat and pressure into a shaped article.

3. A process for obtaining improved articles of manufacture comprising polytetrafluoroethylene which comprises the steps of heating heat darkenable polytetrafluoroethylene in a form presenting a relatively large surface area at a temperature of 50° to 500° C. in an oxidizing atmosphere for a period of at least one-half hour until decolorization of the polytetrafluoroethylene is essentially complete.

4. The process set forth in claim 1 in which said oxidizing atmosphere is chlorine.

ROBERT M. JOYCE, Jr.